(12) United States Patent
Daussin et al.

(10) Patent No.: US 10,281,046 B2
(45) Date of Patent: May 7, 2019

(54) FLUID MACHINE HAVING A LABYRINTH SEAL

(71) Applicant: Danfoss Commercial Compressors, Trevoux (FR)

(72) Inventors: Arnaud Daussin, Saint Germain au Mont d'or (FR); Patrice Bonnefoi, Saint Didier au Mont d'or (FR); Yves Rosson, Villars les Dombes (FR); Nicolas Nouyrigat, Lyons (FR)

(73) Assignee: Danfoss Commercial Compressors, Trevoux (FR)

( * ) Notice: Subject to any disclaimer, the term of this patent is extended or adjusted under 35 U.S.C. 154(b) by 0 days.

(21) Appl. No.: 15/576,433

(22) PCT Filed: May 19, 2016

(86) PCT No.: PCT/EP2016/061183
§ 371 (c)(1),
(2) Date: Nov. 22, 2017

(87) PCT Pub. No.: WO2016/192998
PCT Pub. Date: Dec. 8, 2016

(65) Prior Publication Data
US 2018/0156337 A1 Jun. 7, 2018

(30) Foreign Application Priority Data
Jun. 5, 2015 (FR) ...................................... 15 55135

(51) Int. Cl.
*F01D 11/02* (2006.01)
*F16J 15/447* (2006.01)
*F04D 29/08* (2006.01)

(52) U.S. Cl.
CPC ........... *F16J 15/4472* (2013.01); *F01D 11/02* (2013.01); *F04D 29/08* (2013.01); *F05D 2220/30* (2013.01); *F05D 2240/55* (2013.01)

(58) Field of Classification Search
CPC .... F16J 15/447; F16J 15/4472; F16J 15/4474; F16J 15/4476; F16J 15/4478;
(Continued)

(56) References Cited

U.S. PATENT DOCUMENTS 835,836 A * 11/1906 Schulz ................. F16J 15/4472
277/419
1,505,647 A * 8/1924 Junggren ................ F01D 11/02
277/418

(Continued)

FOREIGN PATENT DOCUMENTS

| AT | 282502 B | 6/1970 |
| CN | 2370225 Y | 3/2000 |
| WO | 2012/097839 A1 | 7/2012 |

OTHER PUBLICATIONS

International Search Report for PCT Serial No. PCT/EP2016/061183 dated Jul. 18, 2016.

*Primary Examiner* — Gilbert Y Lee
(74) *Attorney, Agent, or Firm* — McCormick, Paulding & Huber LLP

(57) ABSTRACT

The fluid machine includes a stationary member (6), a rotary member (5) and a labyrinth seal (9) including a succession of stationary steps (11) formed on the stationary member (6), and a succession of rotary steps (14) formed on the rotary member (5). The labyrinth seal (9) further includes a plurality of stationary recesses (18) each formed in a radial wall portion (12) of a respective stationary step (11), and a plurality of rotary recesses (21) each formed in a radial wall portion (16) of a respective rotary step (14). Each stationary step (11) defines a stationary projection (19) delimited by the
(Continued)

stationary recess (18) formed on said stationary step (11), and each rotary step (14) defines a rotary projection (22) delimited by the rotary recess (21) formed on said rotary step (14). The axial width (Wr) of each of the stationary recesses (18) and of the rotary recesses (21) substantially equals the axial width (Wp) of each of the stationary projections (19) and of the rotary projections (22).

18 Claims, 3 Drawing Sheets

(58) Field of Classification Search
    CPC ...... F01D 11/02; F04D 29/08; F05D 2220/30; F05D 2240/55
    See application file for complete search history.

(56) References Cited

U.S. PATENT DOCUMENTS

| | | | |
|---|---|---|---|
| 3,231,285 A | | 1/1966 | Weltemer et al. |
| 3,630,529 A | * | 12/1971 | Ball .................. F04D 7/065 |
| | | | 165/73 |
| 4,335,886 A | | 6/1982 | Frey et al. |
| 5,244,216 A | | 9/1993 | Rhode |
| 5,823,740 A | | 10/1998 | Cybularz et al. |
| 5,924,844 A | * | 7/1999 | Cybularz ............ F03B 3/02 |
| | | | 415/1 |
| 7,445,213 B1 | | 11/2008 | Pelfrey |
| 2008/0112800 A1 | | 5/2008 | Blatchford et al. |
| 2013/0330169 A1 | * | 12/2013 | Stummer ............ F04D 29/167 |
| | | | 415/13 |

* cited by examiner

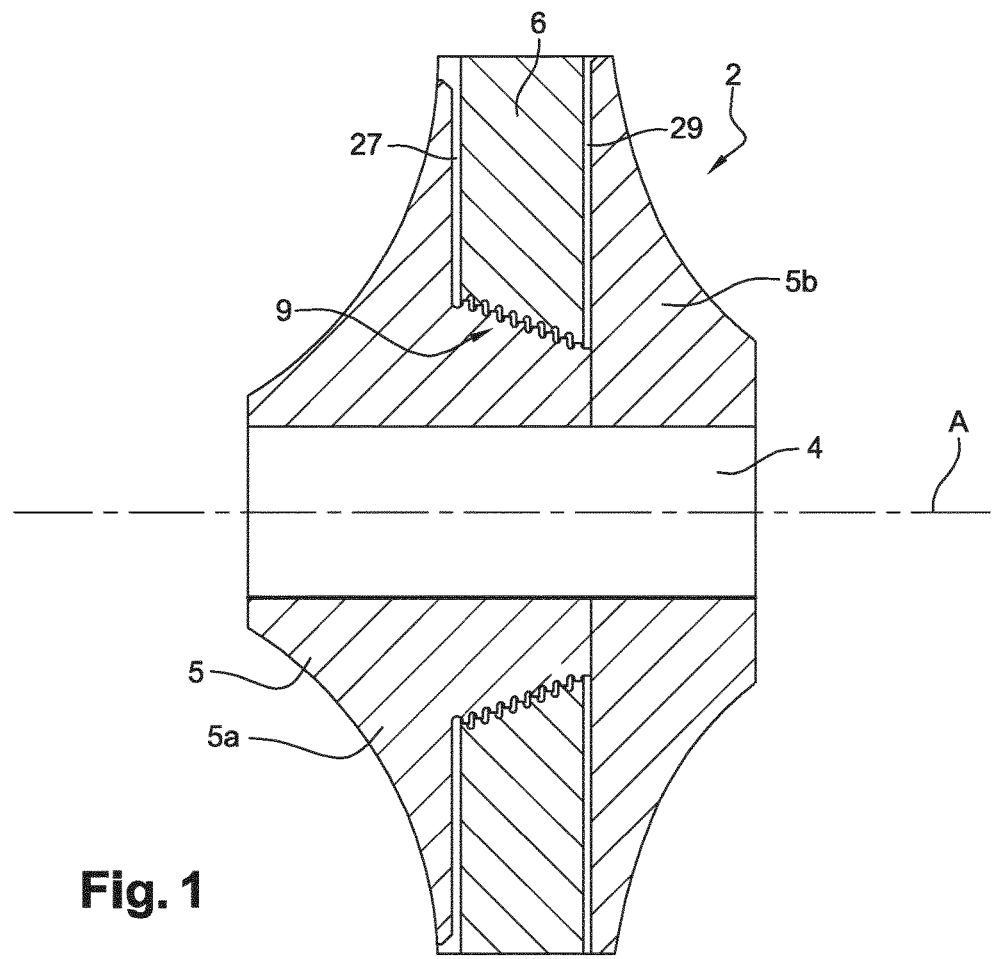
Fig. 1
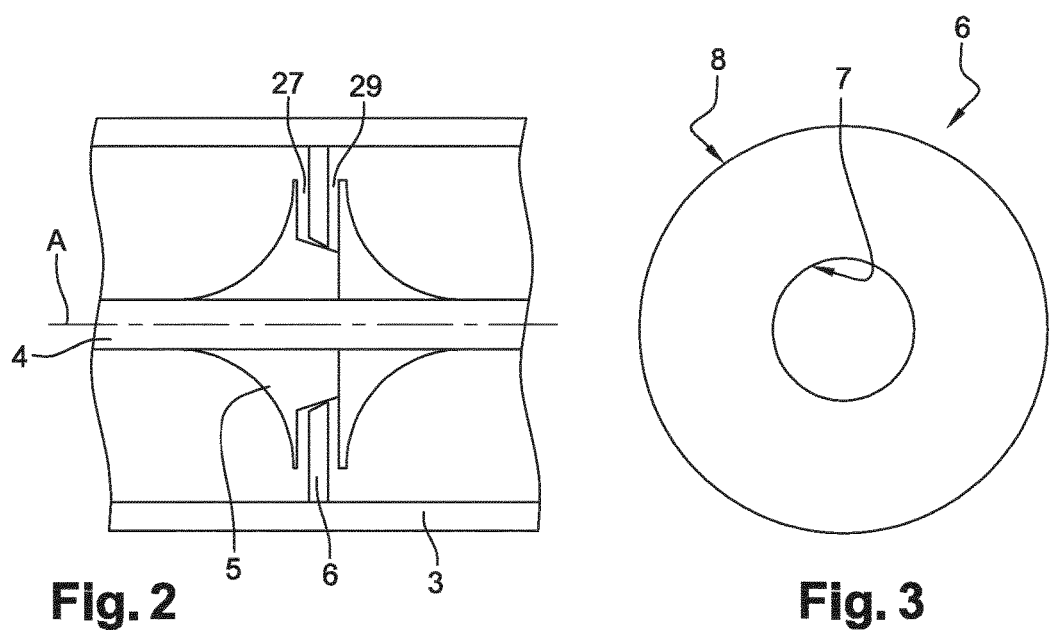
Fig. 2
Fig. 3

FLUID MACHINE HAVING A LABYRINTH SEAL

CROSS-REFERENCE TO RELATED APPLICATIONS

This application is a National Stage application of International Patent Application No. PCT/EP2016/061183, filed on May 19, 2016, which claims priority to French Patent Application No. 1555135, filed on Jun. 5, 2015, each of which is hereby incorporated by reference in its entirety.

TECHNICAL FIELD

The present invention relates to a fluid machine, for example a centrifugal compressor, including a labyrinth seal defined between a rotating member and a stationary member of the fluid machine, and configured to minimize fluid flow between a high pressure section and a low pressure section formed within a housing of the fluid machine.

BACKGROUND

U.S. Pat. No. 5,244,216 discloses a fluid machine including:
- a housing,
- a rotational shaft located within the housing,
- a stationary member connected to the housing,
- a rotary member connected to the rotational shaft, and
- a labyrinth seal configured to minimize or control fluid flow across the labyrinth seal, the labyrinth seal including:
  - a succession of stationary steps formed on the stationary member, each stationary step including a radial wall portion extending substantially parallely to a longitudinal axis of the rotational shaft and an axial wall portion extending substantially perpendicularly to the longitudinal axis of the rotational shaft,
  - a succession of rotary steps formed on the rotary member, each rotary step including a radial wall portion extending substantially parallely to the longitudinal axis of the rotational shaft and an axial wall portion extending substantially perpendicularly to the longitudinal axis of the rotational shaft,
  - a plurality of stationary recesses, each stationary recess being formed in the radial wall portion of a respective stationary step, each stationary step defining a stationary projection delimited by the stationary recess formed on said stationary step and by the axial wall portion of said stationary step, and
  - a plurality of rotary recesses, each rotary recess being formed in the radial wall portion of a respective rotary step and adjacent to the axial wall portion of an adjacent rotary step located upstream said respective rotary step, each rotary step defining a rotary projection delimited by the rotary recess formed on said rotary step and by the axial wall portion of said rotary step.

Such a configuration of the labyrinth seal induces "obstacles" and restrictions to the leakage flow, and thus reduces fluid leakage through the labyrinth seal.

However such a labyrinth seal has flow passages and cavities of complicated shapes, which reduces the number of stationary and rotary steps available on a given axial sealing length, and which are complicated to manufacture. Further, such a labyrinth seal requires very accurate mounting and axial orientation between the rotating and stationary members. Furthermore, the configuration of such a labyrinth seal would be too fragile to be transferred to small and compact fluid machines.

SUMMARY

It is an object of the present invention to provide a fluid machine having an improved labyrinth seal which can overcome the drawbacks encountered with conventional labyrinth seals.

Another object of the present invention is to provide a robust, efficient and easy to manufacture labyrinth seal having a simple design which allows large tolerances on axial dimensions of the stationary and rotary members and large relative axial displacement between the stationary and rotary members. This is especially important in very small and compact fluid machines, where the total axial length of the labyrinth seal is a few millimeters and hence the axial length of each step is a few hundred microns.

According to the invention such a fluid machine includes:
- a housing,
- a rotational shaft located within the housing,
- a stationary member connected to the housing,
- a rotary member connected to the rotational shaft,
- a labyrinth seal configured to minimize or control fluid flow across the labyrinth seal, the labyrinth seal including:
  - a succession of stationary steps formed on the stationary member, each stationary step of said succession of stationary steps including a radial wall portion extending substantially parallely to a longitudinal axis of the rotational shaft and an axial wall portion extending substantially perpendicularly to the longitudinal axis of the rotational shaft,
  - a succession of rotary steps formed on the rotary member, each rotary step of said succession of rotary steps including a radial wall portion extending substantially parallely to the longitudinal axis of the rotational shaft and an axial wall portion extending substantially perpendicularly to the longitudinal axis of the rotational shaft,
  - a plurality of stationary recesses, each stationary recess of said plurality of stationary recesses being formed in the radial wall portion of a respective stationary step and adjacent to the axial wall portion of an adjacent stationary step located downstream said respective stationary step, each stationary step being configured to define a stationary projection delimited by the stationary recess formed on said stationary step and by the axial wall portion of said stationary step,
  - a plurality of rotary recesses, each rotary recess of said plurality of rotary recesses being formed in the radial wall portion of a respective rotary step and adjacent to the axial wall portion of an adjacent rotary step located upstream said respective rotary step, each rotary step being configured to define a rotary projection delimited by the rotary recess formed on said rotary step and by the axial wall portion of said rotary step, and
  - wherein the axial width of each of the stationary recesses and of the rotary recesses substantially equals the axial width of each of the stationary projections and of the rotary projections.

Such a configuration, and particularly such a sizing of the stationary and rotary recesses and of the stationary and rotary projections, improves the efficiency and the robustness of the labyrinth seal. Further such a configuration of the stationary and rotary recesses and of the stationary and rotary projections reduces the manufacturing constraints for manufacturing the stationary and rotary members, and thus reduces the manufacturing cost of the fluid machine.

Furthermore, such a configuration of the labyrinth seal eases the assembly of the stationary and rotary members, and reduces the axial motion sensitivity of the rotary member during assembly and during operation of the fluid machine.

In the present patent application, the wordings "downstream" and "upstream" and similar wordings are considered with respect to the direction of the fluid flow through the labyrinth seal.

The fluid machine may also include one or more of the following features, taken alone or in combination.

According to an embodiment of the invention, the labyrinth seal is configured to minimize or control fluid flow between a high pressure section and a low pressure section formed within the housing.

According to an embodiment of the invention, the radial wall portions and the axial wall portions of the stationary steps and of the rotary steps are substantially planar.

According to an embodiment of the invention, the radial wall portions of the stationary steps and of the rotary steps extend parallely to the longitudinal axis of the rotational shaft. According to another embodiment of the invention, the radial wall portions of the stationary steps and of the rotary steps extend at an angle between about −5 degrees and about 5 degrees with respect to the longitudinal axis of the rotational shaft.

According to an embodiment of the invention, the axial wall portions of the stationary steps and of the rotary steps extend perpendicularly to the longitudinal axis of the rotational shaft. According to another embodiment of the invention, the axial wall portions of the stationary steps and of the rotary steps extend at an angle between about 85 degrees and about 95 degrees with respect to the longitudinal axis of the rotational shaft.

According to an embodiment of the invention, the axial width of each of the stationary recesses and of the rotary recesses equals the axial width of each of the stationary projections and of the rotary projections. According to another embodiment of the invention, the ratio between the axial width of each of the stationary recesses and of the rotary recesses and the axial width of each of the stationary projections and of the rotary projections is between 0.8 and 1.2, or between 0.9 and 1.1.

According to another embodiment of the invention, the ratio between the average of the axial widths of the stationary recesses and of the rotary recesses and the average of the axial widths of the stationary projections and of the rotary projections is between 0.8 and 1.2, or between 0.9 and 1.1.

According to an embodiment of the invention, the stationary steps are axially offset from each other and successively arranged along an inner radial surface of the stationary member, and the rotary steps are axially offset from each other and successively arranged along an outer radial surface of the rotary member.

According to an embodiment of the invention, the inner radial surface of the stationary member and the outer radial surface of the rotary member are opposite to each other.

According to an embodiment of the invention, the stationary steps and the rotary steps are annular.

According to an embodiment of the invention, the stationary recesses and the rotary recesses are annular.

According to an embodiment of the invention, the stationary projections and the rotary projections are annular.

According to an embodiment of the invention, the inner radial surface of the stationary member and the outer radial surface of the rotary member are annular.

According to an embodiment of the invention, each stationary projection extends substantially perpendicularly to the longitudinal axis of the rotational shaft, and each rotary projection extends substantially perpendicularly to the longitudinal axis of the rotational shaft.

According to an embodiment of the invention, each stationary projection at least partially faces a respective rotary projection.

According to an embodiment of the invention, each stationary projection extends radially inward towards the respective rotary projection, and each rotary projection extends radially outward towards the respective stationary projection.

According to an embodiment of the invention, each stationary projection and the respective rotary projection delimit a flow passage extending substantially parallely to the longitudinal axis of the rotational shaft.

According to an embodiment of the invention, each stationary projection includes an upstream edge and a downstream edge and each rotary projection includes an upstream edge and a downstream edge, the upstream edge of each stationary projection being axially offset from the upstream edge of the respective rotary projection by an axial distance.

According to an embodiment of the invention, the upstream edge of each stationary projection is upstreamly axially offset from the upstream edge of the respective rotary projection.

According to an embodiment of the invention, the upstream and downstream edges of each stationary projection are sharp, and the upstream and downstream edges of each rotary projection are sharp.

According to an embodiment of the invention, the axial distance is larger than the maximum allowed relative axial movement between the rotary member and the stationary member during operation of the fluid machine.

According to an embodiment of the invention, each stationary recess at least partially faces a respective rotary recess.

According to an embodiment of the invention, the fluid machine further includes a succession of cavities each having a flow inlet and a flow outlet, each cavity being partially delimited by a stationary recess and a rotary recess, the flow inlet of each cavity being positioned at a location between the respective stationary recess and the axial wall portion of an upstream rotary step.

According to an embodiment of the invention, the flow inlet of each cavity is facing the axial wall portion of the downstream stationary step.

According to an embodiment of the invention, each cavity is further delimited by the axial wall portion of an adjacent stationary step located downstream said cavity and by the axial wall portion of an adjacent rotary step located upstream said cavity.

According to an embodiment of the invention, each cavity is annular.

According to an embodiment of the invention, the labyrinth seal is configured such that the pressure in a downstream cavity is lower than the pressure in an upstream cavity.

According to an embodiment of the invention, each stationary recess has a rounded or curved concave bottom and each rotary recess has a rounded or curved concave bottom.

According to an embodiment of the invention, the stationary member has a disc shape.

According to an embodiment of the invention, the stationary member is made in one piece and is assembled in an axial direction in relation to the rotary member.

According to an embodiment of the invention, the stationary member made in two separated pieces and is assembled in a radial direction around the rotary member.

According to an embodiment of the invention, the labyrinth seal includes a flow intake located upstream the cavities and configured to supply the cavities with a fluid flow.

According to an embodiment of the invention, the fluid machine is a centrifugal compressor, a turbine or a pump.

According to an embodiment of the invention, the rotary member is integrally formed with the rotational shaft.

According to an embodiment of the invention, the stationary and rotary steps have substantially the same shape, and the stationary and rotary recesses have substantially the same shape. This configuration allows notably to manufacture the both sides of the labyrinth seal with the same tool.

These and other advantages will become apparent upon reading the following description in view of the drawing attached hereto representing, as non-limiting example, an embodiment of a fluid machine according to the invention.

BRIEF DESCRIPTION OF THE DRAWINGS

The following detailed description of one embodiment of the invention is better understood when read in conjunction with the appended drawings being understood, however, that the invention is not limited to the specific embodiment disclosed.

FIGS. 1 and 2 are partial section views of a fluid machine according to a first embodiment of the invention.

FIG. 3 is a front view of a stationary member of the fluid machine of FIG. 1.

DETAILED DESCRIPTION

Figure 4:
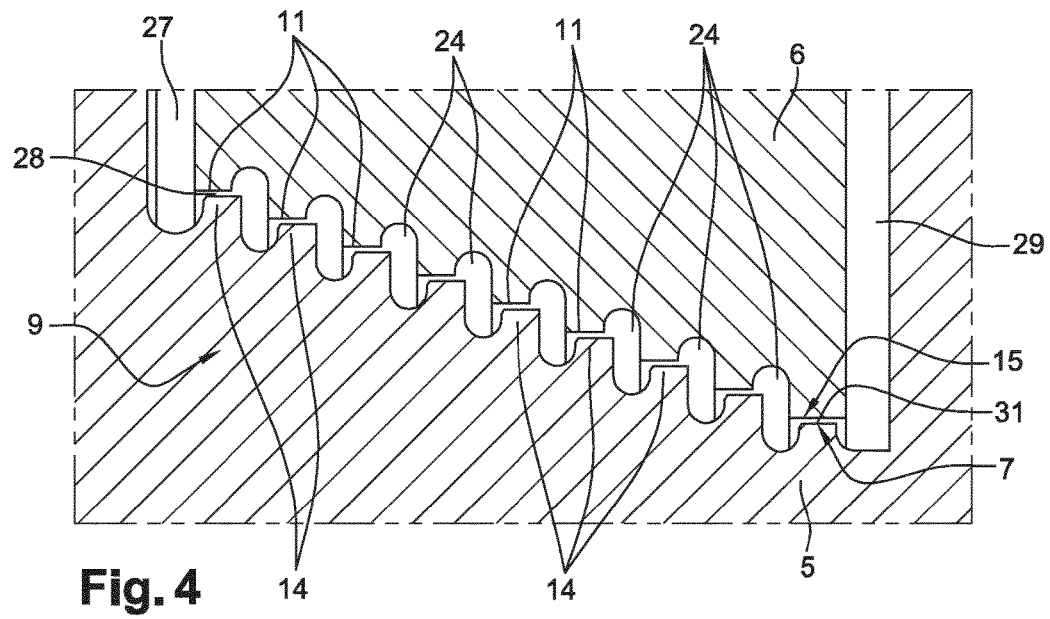
FIG. 4 is an enlarged view of a detail of FIG. 1.

In the description which follows, the same elements are designated with the same references in the different embodiments.

FIGS. 1 to 5 discloses a fluid machine 2, for example a centrifugal compressor, a turbine or a pump, including a housing 3 and a rotational shaft 4 rotatably mounted within the housing 3 and rotatably supported by radial bearings and axial bearing (not shown on the figures). The axial bearings are configured to allow a very limited axial movement of the rotational shaft during operation of the fluid machine 2.

The fluid machine 2 further includes a rotary member 5 fixed to the rotational shaft 4, and a stationary member 6 connected to the housing 3 and surrounding the rotary member 5. The housing 3 may for example include a fixed support (not shown on the figures) on which is fixed the stationary member 6.

As better shown on FIG. 3, the stationary member 6 has a disc shape, and includes an inner peripheral surface 7 and an outer peripheral surface 8. According to the embodiment shown on FIGS. 1 to 5, the stationary member 6 is made in one piece, and it is assembled in an axial direction between two parts 5a and 5b of the rotary member 5.

The fluid machine 2 furthermore includes a stepped labyrinth seal 9 configured to minimize or control fluid flow between a high pressure section 27 and a low pressure section 29 formed within the housing 3.

The labyrinth seal 9 includes a succession of annular stationary steps 11 axially offset from each other and formed on the inner peripheral surface 7 of the stationary member 6. Each stationary step 11 includes an annular radial wall portion 12 extending parallely to a longitudinal axis A of the rotational shaft 4 and an annular axial wall portion 13 extending perpendicularly to the longitudinal axis A of the rotational shaft 4. The radial wall portions 12 and the axial wall portions 13 of the stationary steps 11 are advantageously substantially planar.

The labyrinth seal 9 includes a succession of annular rotary steps 14 axially offset from each other and formed on an outer peripheral surface 15 of the rotary member 5 which is opposite to and adjacent to the inner peripheral surface 7 of the stationary member 6. Each rotary step 14 includes an annular radial wall portion 16 extending parallely to the longitudinal axis A of the rotational shaft 4 and an annular axial wall portion 17 extending perpendicularly to the longitudinal axis A of the rotational shaft 4. The radial wall portions 16 and the axial wall portions 17 of the rotary steps 14 are advantageously substantially planar.

The labyrinth seal 9 also includes a plurality of annular stationary recesses 18 formed on the stationary member 6. Each stationary recess 18 is formed in the radial wall portion 12 of a respective stationary step 11 and adjacent to the axial wall portion 13 of an adjacent stationary step 11 located downstream said respective stationary step 11. Each stationary recess 18 has advantageously a rounded or curved concave bottom.

Each stationary step 11 thus defines an annular stationary tooth or projection 19 delimited by the stationary recess 18 formed on said stationary step 11 and by the axial wall portion 13 of said stationary step 11. Each stationary projection 19 extends perpendicularly to the longitudinal axis A of the rotational shaft 4, and includes an upstream edge and a downstream edge.

The labyrinth seal 9 also includes a plurality of annular rotary recesses 21 formed on the rotary member 5. Each rotary recess 21 is formed in the radial wall portion 16 of a respective rotary step 14 and adjacent to the axial wall portion 17 of an adjacent rotary step 14 located upstream said respective rotary step 14. Each rotary recess 21 has advantageously a rounded or curved concave bottom. As better shown on FIG. 5, each rotary recess 21 at least partially faces a respective stationary recess 18.

Each rotary step 14 thus defines an annular rotary tooth or projection 22 delimited by the rotary recess 21 formed on said rotary step 14 and by the axial wall portion 17 of said rotary step 14. Each rotary projection 22 extends perpendicularly to the longitudinal axis A of the rotational shaft A, and includes an upstream edge and a downstream edge.

Each rotary projection 22 at least partially faces a respective stationary projection 19. Particularly, each stationary projection 19 extends radially inward towards the respective rotary projection 22, and each rotary projection 22 extends radially outward towards the respective stationary projection 19. Further each stationary projection 19 and the respective rotary projection 22 delimit an annular flow passage 23 extending parallely to the longitudinal axis A of the rotational shaft 4.

Figure 5:
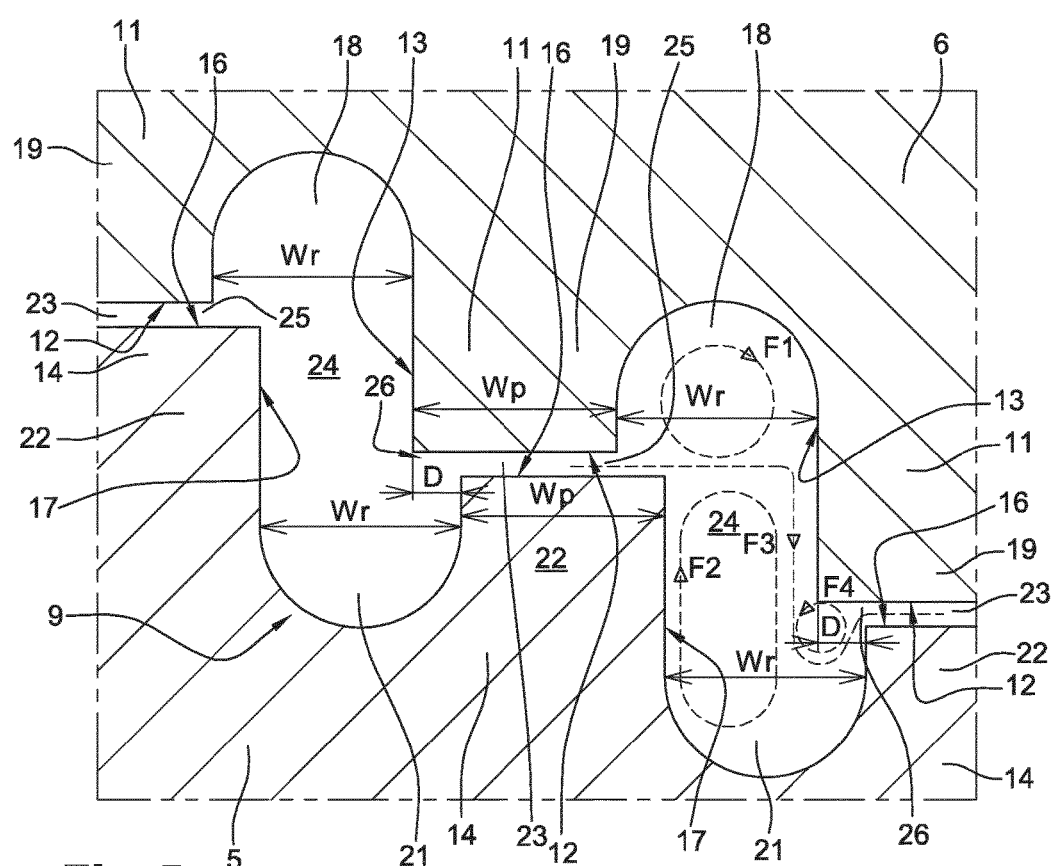
FIG. 5 is an enlarged view of a detail of FIG. 4.

As better shown on FIG. 5, the upstream edge of each stationary projection 19 is upstreamly axially offset from the upstream edge of the respective rotary projection 22 by an axial distance D. Advantageously, the axial distance D is larger than the maximum allowed axial movement of the rotary member 5 during operation of the fluid machine.

Further, as shown on FIG. 5, the axial width Wr of each of the stationary recesses 18 and of the rotary recesses 21 substantially equals the axial width Wp of each of the stationary projections 19 and of the rotary projections 22.

The fluid machine 2 further includes a succession of annular cavities 24 each having a flow inlet 25 and a flow outlet 26. The flow outlet 26 and the flow inlet 25 of two adjacent cavities are fluidly connected by a respective flow passage 23.

Each cavity 24 is delimited by a stationary recess 18, a rotary recess 21, the axial wall portion 13 of an adjacent stationary step 11 located downstream said cavity 24 and by the axial wall portion 17 of an adjacent rotary step 14 located upstream said cavity 24. The flow inlet 25 of each cavity 24 is positioned at a location between the respective stationary recess 18 and the respective axial wall portion 17, and is facing the respective axial wall portion 13.

The fluid machine 2 further includes a high pressure chamber 27 defined by the rotary and stationary members 5, 6, and located upstream the cavities 24. The labyrinth seal 9 includes a flow intake 28 fluidly connected to the high pressure chamber 27, and configured to supply the cavities 24 with a fluid flow coming from the high pressure chamber 27.

The fluid machine 2 also includes a low pressure chamber 29 defined by the rotary and stationary members 5, 6, and located downstream the cavities 24. The labyrinth seal 9 includes a flow output 31 fluidly connected to the low pressure chamber 29.

In use, a fluid flow enters the first cavity 24, which is adjacent to the high pressure chamber 27, via the flow intake 28 and the flow inlet 25 of said first cavity 24. As the flow inlet 25 is facing the axial wall portion 13 of the downstream stationary step 11, the fluid flow impacts said axial wall portion 13. Such an impact generates a first recirculation flow F1 within an upper portion of the first cavity 24, a second recirculation flow F2 within a lower portion of the first cavity 24, and a leakage flow F3 going down towards the flow outlet 26 of the first cavity 24 in a direction substantially parallel to axial wall portion 13. Due to the directional change at the flow outlet 26, a third recirculation flow F4 is created at the offsetted edges of stationary projection 19 and rotary projection 22. The third recirculation flow F4 is reducing the effective flow area for the leakage flow F3 leaving the cavity 24 at flow outlet 26. After having passed flow passage 23, the leakage flow F3 then enters the second cavity 24 where a first recirculation flow, a second and a third recirculation flow and a leakage flow are also generated, and where the leakage flow enters the third cavity 24, and so on.

The generation of a first recirculation flow F1, a second recirculation flow F2, a third recirculation flow F3 and a leakage flow F4 in the successive cavities 24 reduces largely the fluid leakage through the labyrinth seal 9, and allows obtaining a low leakage rate through the labyrinth seal 9.

Figure 6:
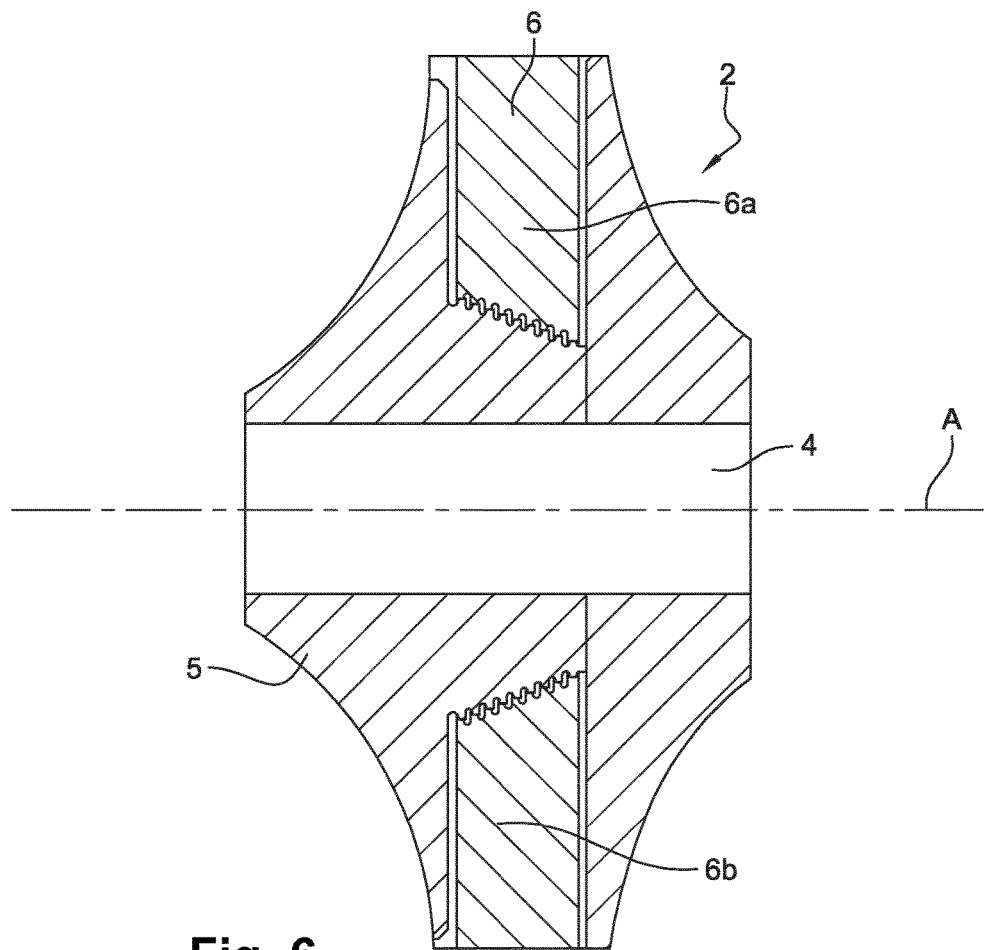
FIG. 6 is a partial section view of a fluid machine according to a second embodiment of the invention.
Figure 7:
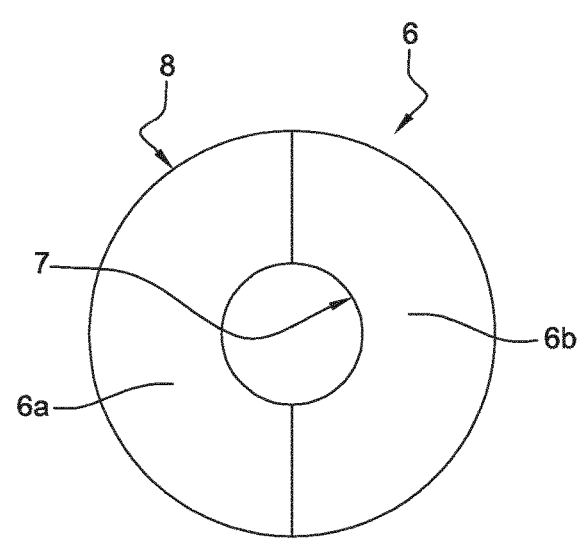
FIG. 7 is a front view of a stationary member of the fluid machine of FIG. 6.

FIGS. 6 and 7 disclose a fluid machine 2 according to a second embodiment of the invention which differs from the embodiment shown on FIGS. 1 to 5 essentially in that the stationary member 6 is made in two separated pieces 6a, 6b, and that is assembled in a radial direction around the rotary member 5, which is made as a unitary part.

Of course, the invention is not restricted to the embodiments described above by way of non-limiting examples, but on the contrary it encompasses all embodiments thereof.

What is claimed is:

1. A fluid machine including:
   a housing,
   a rotational shaft located within the housing,
   a stationary member connected to the housing,
   a rotary member connected to the rotational shaft,
   a labyrinth seal configured to minimize or control fluid flow across the labyrinth seal, the labyrinth seal including:
      a succession of stationary steps formed on the stationary member, each stationary step of said succession of stationary steps including a radial wall portion extending substantially parallely to a longitudinal axis (A) of the rotational shaft and an axial wall portion extending substantially perpendicularly to the longitudinal axis (A) of the rotational shaft,
      a succession of rotary steps formed on the rotary member, each rotary step of said succession of rotary steps including a radial wall portion extending substantially parallely to the longitudinal axis (A) of the rotational shaft and an axial wall portion extending substantially perpendicularly to the longitudinal axis (A) of the rotational shaft,
      a plurality of stationary recesses, each stationary recess of said plurality of stationary recesses being formed in the radial wall portion of a respective stationary step and adjacent to the axial wall portion of an adjacent stationary step located downstream said respective stationary step, each stationary step being configured to define a stationary projection delimited by the stationary recess formed on said stationary step and by the axial wall portion of said stationary step, and
      a plurality of rotary recesses, each rotary recess of said plurality of rotary recesses being formed in the radial wall portion of a respective rotary step and adjacent to the axial wall portion of an adjacent rotary step located upstream said respective rotary step, each rotary step being configured to define a rotary projection delimited by the rotary recess formed on said rotary step and by the axial wall portion of said rotary step,
   wherein the axial width (Wr) of each of the stationary recesses and of the rotary recesses substantially equals the axial width (Wp) of each of the stationary projections and of the rotary projections,
   wherein each stationary projection at least partially faces a respective rotary projection; and
   wherein each stationary projection includes an upstream edge and a downstream edge and each rotary projection includes an upstream edge and a downstream edge, the upstream edge of each stationary projection being axially offset from the upstream edge of the respective rotary projection by an axial distance (D).

2. The fluid machine according to claim 1, wherein the stationary steps are axially offset from each other and successively arranged along an inner radial surface of the stationary member, and the rotary steps are axially offset from each other and successively arranged along an outer radial surface of the rotary member.

3. The fluid machine according to claim 2, wherein each stationary projection extends substantially perpendicularly to the longitudinal axis (A) of the rotational shaft, and each rotary projection extends substantially perpendicularly to the longitudinal axis (A) of the rotational shaft.

4. The fluid machine according to claim 2, wherein each stationary recess at least partially faces a respective rotary recess.

5. The fluid machine according to claim 1, wherein each stationary projection extends substantially perpendicularly to the longitudinal axis (A) of the rotational shaft, and each rotary projection extends substantially perpendicularly to the longitudinal axis (A) of the rotational shaft.

6. The fluid machine according to claim 5, wherein each stationary recess at least partially faces a respective rotary recess.

7. The fluid machine according to claim 1, wherein each stationary projection and the respective rotary projection delimit a flow passage extending substantially parallely to the longitudinal axis (A) of the rotational shaft.

8. The fluid machine according to claim 7, wherein each stationary recess at least partially faces a respective rotary recess.

9. The fluid machine according to claim 1, wherein the axial distance (D) is larger than the maximum allowed relative axial movement between the rotary member and the stationary member during operation of the fluid machine.

10. The fluid machine according to claim 9, wherein the upstream and downstream edges of each stationary projection are sharp, and the upstream and downstream edges of each rotary projection are sharp.

11. The fluid machine according to claim 9, wherein each stationary recess at least partially faces a respective rotary recess.

12. The fluid machine according to claim 1, wherein the upstream and downstream edges of each stationary projection are sharp, and the upstream and downstream edges of each rotary projection are sharp.

13. The fluid machine according to claim 1, wherein each stationary recess at least partially faces a respective rotary recess.

14. The fluid machine according to claim 1, further including a succession of cavities each having a flow inlet and a flow outlet, each cavity being partially delimited by a stationary recess and a rotary recess, the flow inlet of each cavity being positioned at a location between the respective stationary recess and the axial wall portion of an upstream rotary step.

15. The fluid machine according to claim 14, wherein the flow inlet of each cavity is facing the axial wall portion of the downstream stationary step.

16. The fluid machine according to claim 1, wherein the fluid machine is a centrifugal compressor, a turbine or a pump.

17. The fluid machine according to claim 1, wherein the rotary member is integrally formed with the rotational shaft.

18. The fluid machine according claim 1, wherein the stationary and rotary steps have substantially the same shape, and the stationary and rotary recesses have substantially the same shape.

\* \* \* \* \*

UNITED STATES PATENT AND TRADEMARK OFFICE
CERTIFICATE OF CORRECTION

PATENT NO.         : 10,281,046 B2
APPLICATION NO.    : 15/576433
DATED              : May 7, 2019
INVENTOR(S)        : Arnaud Daussin et al.

Page 1 of 1

It is certified that error appears in the above-identified patent and that said Letters Patent is hereby corrected as shown below:

On the Title Page

Item (72), In the list of Inventors, Line 5, Nicolas Nouyrigat, delete "Lyons" and substitute --Lyon--.

Signed and Sealed this
Second Day of July, 2019

Andrei Iancu
*Director of the United States Patent and Trademark Office*